United States Patent
Sidmore et al.

Patent Number: 5,603,457
Date of Patent: Feb. 18, 1997

[54] TRANSFER PANEL NOZZLE

[76] Inventors: Philip W. Sidmore, 5 Cedar Point Rd., Durham, N.H. 03824; Randolph A. Cotter, 2 Carol Ann Rd., Lynnfield, Mass. 01940; Harry H. Durgin, 35 Ruby Rd., Portsmouth, N.H. 03801

[21] Appl. No.: 307,143

[22] Filed: Sep. 16, 1994

[51] Int. Cl.$^6$ .................................................. B05B 1/00
[52] U.S. Cl. .................................................. 239/600
[58] Field of Search .................... 239/600, 548; 285/189, 286; 403/270–272; 29/890.142; 228/125; 266/51.53

[56] References Cited

U.S. PATENT DOCUMENTS

| | | | |
|---|---|---|---|
| 1,889,874 | 12/1932 | Obert | 285/189 |
| 3,242,334 | 3/1966 | Hansen | 250/504 R |
| 3,505,989 | 4/1970 | Truhan | 600/21 |
| 3,747,504 | 7/1973 | Turko et al. | 454/59 |
| 4,304,224 | 12/1981 | Fortney | 600/21 |
| 4,322,598 | 3/1982 | Blair | 285/189 X |
| 4,352,714 | 10/1982 | Patterson et al. | 403/272 X |
| 4,377,969 | 3/1983 | Nelson | 454/59 |
| 4,627,647 | 12/1986 | Hauff | 285/189 |
| 4,630,415 | 12/1986 | Attwell | 285/189 X |
| 4,667,580 | 5/1987 | Wetzel | 454/187 |
| 4,676,144 | 6/1987 | Smith, III | 454/187 |
| 4,699,177 | 10/1987 | Thomas | 285/189 X |
| 4,976,815 | 12/1990 | Hiratsuka et al. | 156/345 |
| 5,259,812 | 11/1993 | Kleinsek | 454/57 |
| 5,299,584 | 4/1994 | Miyazaki et al. | 134/56 R |

FOREIGN PATENT DOCUMENTS

| | | | |
|---|---|---|---|
| 2229010 | 1/1975 | France | 285/189 |

*Primary Examiner*—Lesley D. Morris
*Attorney, Agent, or Firm*—Hamilton, Brook, Smith & Reynolds, P.C.

[57] ABSTRACT

A device for transferring pharmaceuticals and the like comprising a panel structure having at least one transfer nozzle projecting through the structure. A ring is located on the nozzle intermediate its ends for securing the nozzle to the panel and a weldment joins the ring to the panel structure. Additionally, there is disclosed a grinding and polishing device for removing the weldment between the transfer nozzle and the panel structure and for polishing it and an area contiguous with the weldment.

9 Claims, 5 Drawing Sheets

TRANSFER PANEL NOZZLE

FIELD OF THE INVENTION

This invention relates to transfer mechanism for pharmaceuticals and the like and more particularly it is directed to a transfer panel for mounting a plurality of nozzles or conducting conduits for mixing pharmaceuticals and transferring them from one container to another.

BACKGROUND OF THE INVENTION

Pharmaceuticals, drugs, vaccines and the like obviously have to be made and stored in the cleanest possible conditions. Pharmaceutical companies, on a daily basis, are making, storing, transferring, shipping pharmaceuticals in great quantities. Contamination cannot be tolerated. This invention relates to a transfer panel structure where at least one common nozzle, also called a ferrule, is secured for support to the panel structure and may be connected to one or more other nozzles or conduits to direct pharmaceuticals from one tank or drum to another or to transfer lines leading to shipping containers, etc.. The inside surface of the nozzle, ferrule, or conduit, as it will be called alternatively herein, by necessity must be an extremely sterile barrier for pharmaceutical or biotechnology applications.

Such transfer panels are employed not only in the pharmaceutical industry, but the food, beverage and dairy industries or any industry where sterility is a requirement.

The nozzles which are secured to the transfer panels for support to bring pharmaceuticals from one location and direct them to another orderly direction of flow. Frequently, there are as many as six nozzle connections to a common port which are joined by jumper conduits.

The transfer panels, per se, are basically supports for the nozzles and can be mounted on legs, secured by brackets to a floor or suspended from the ceiling. They are generally arranged in vertical orientation with the various nozzles extending through the transfer panel in substantially horizontal orientation.

The nozzles pass through the transfer panel and are welded into position. In the past, holes were formed in the panel of approximately the same size as the outer diameter of the transfer nozzles. The nozzles were then inserted through the hole and welded in place. In the welding process, the inside of the nozzle frequently became burned, scored and was left with a surface which virtually invited contamination. Rectifying the problem, required cleaning and polishing of each nozzle.

In recent technology, the interiors of the nozzles are electropolished to produce surfaces that are of extremely high quality with a finish that is smooth and mirror-like. If those surfaces, through the welding process, are burned by heat transferred through the nozzle, they cannot be refurbished by electropolishing.

The present invention is directed to a transfer panel having nozzles of a unique design secured through the panel by a process which does not result in the interior being burned or scored through welding. The invention is also directed to apparatus for finishing the welded connection by grinding and polishing excess weld material.

SUMMARY OF THE INVENTION

The invention resides in a transfer device for pharmaceuticals and the like comprising a panel structure which is normally oriented in a substantially vertical position. There is at least one transfer nozzle projecting through the panel structure and in most instances there are more than one nozzle. An integral, annular, ring surrounds the transfer nozzle intermediate its ends for securing the nozzle to the panel structure. A circular weldment joins the ring to the panel structure at a location spaced from the circular intersection of the transfer nozzle and the panel. The transfer nozzle may have a connector flange on one of its ends to connect the nozzle to a transfer tube or pipe.

The transfer device may include a pair of circular weldments joining the annular ring to the panel structure, one each on opposite sides of the panel structure. The circular weldment on the side of the panel structure facing the connector flange is ground and polished flush with the panel structure.

In addition, the outer diameter of the tubular portion of the transfer nozzle which is adjacent to the intersection with the panel structure may be polished as well. In addition, the entire length of the tubular portion of the transfer nozzle extending from the panel structure to the connector flange may be polished. A grinding and polishing device is disclosed for finishing surfaces at the intersection between the circular or tubular portion of the transfer nozzle and the flat portion of the transfer panel from which the circular member projects is disposed. The device includes a hollow, cylindrical head rotatable about a predetermined axis. The head may be divided into at least two separable reassemble parts. The parts of the head have, when assembled, an upper and lower circular bearing surface each surface being engagable with the tubular portion of the circular member. A flat surface is formed on the lower end of the grinding and polishing head, which surface is adapted selectively to receive grinding and polishing material to first grind the head of the circular weldment bead projecting from the "clean" side of the transfer panel and then to polish not only the weldment but a circular area on the transfer panel contiguous with the weldment.

The above and other features of the invention including various and novel details of construction and combination of parts will now be more particularly described with reference to the accompanying drawings and pointed out in the claims. It will be understood that the particular transfer panel nozzle embodying the invention is shown by way of illustration only and not as a limitation of the invention. The principles and features of this invention may be employed in varied and numerous embodiments without departing from the scope of the invention.

DETAILED DESCRIPTION OF THE INVENTION

Figure 1:
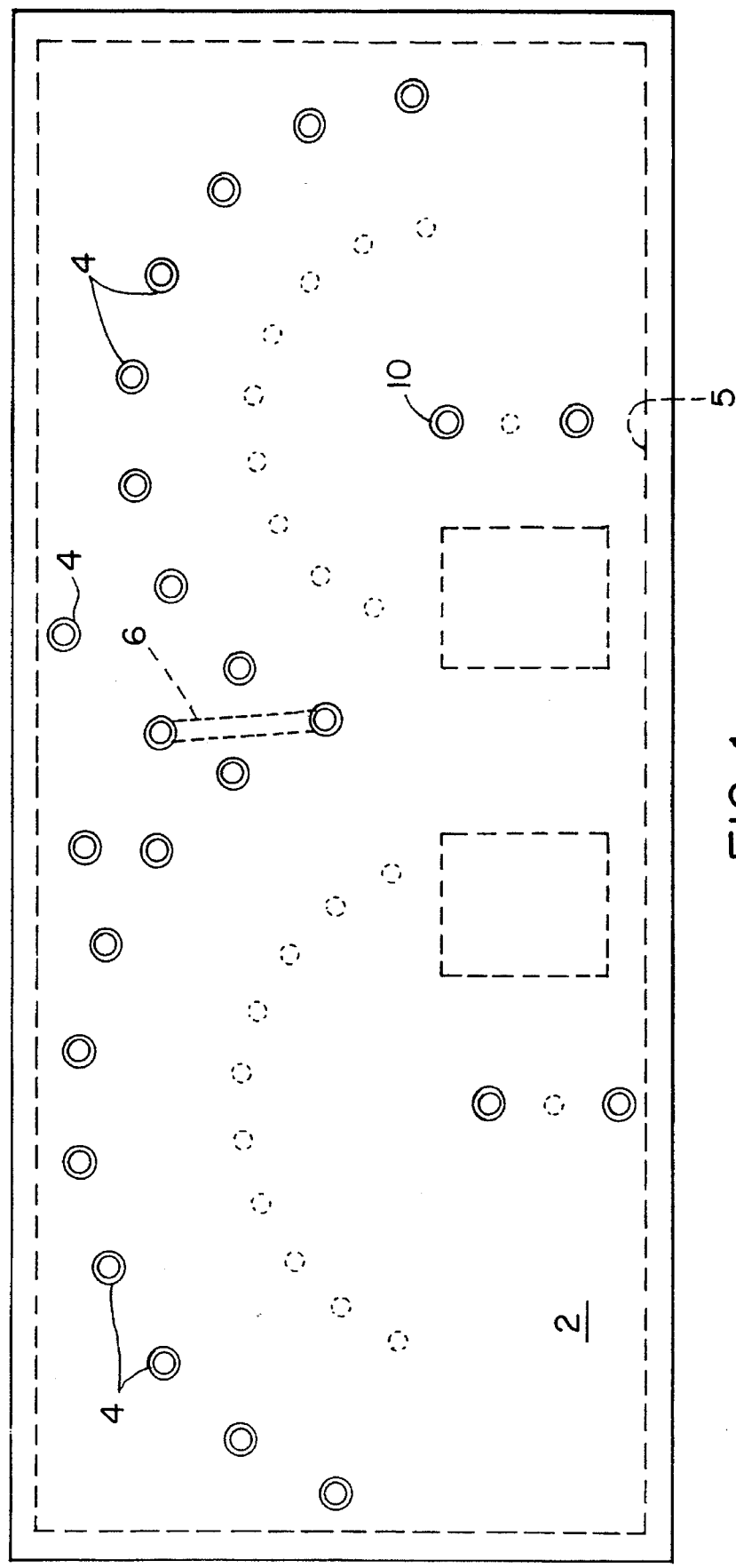
FIG. 1 is a front vertical view of the "clean" side of a transfer panel forming part of the present invention.

FIG. 1 shows a transfer device for pharmaceuticals and the like. It includes a panel structure generally designated 2. The illustrative panel structure is approximately 4 feet high by 9 feet wide and about ¼ inch in thickness and is made of stainless steel. It is arranged in a vertical orientation. The panel structure 2 will have at least one, and in this case approximately twenty transfer nozzles 4, projecting through the panel. The panel structure may be supported by feet or hung from a ceiling. For strengthening, the transfer panel is bounded by a frame member 5. The function of the panel is to mount the transfer nozzles which pass through the panel substantially normal to its vertical planar surface. As will be seen in FIG. 2, two such nozzles 4 may be joined by a U-shaped transfer tube 6 to permit pharmaceutical liquids to flow from one transfer nozzle to another. It will be understood that any one or more of the transfer nozzles may be interconnected, one to another, in series, in parallel or in any other desired configuration depending upon the function they are to perform in transferring pharmaceutical fluids or the like.

Figure 2:
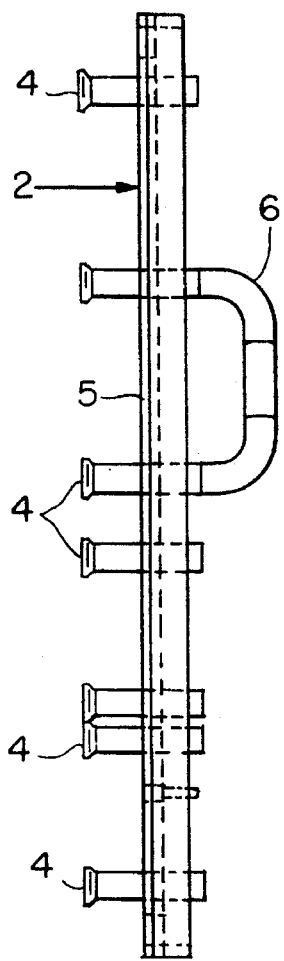
FIG. 2 is an edge view of the transfer panel.
Figure 3A:
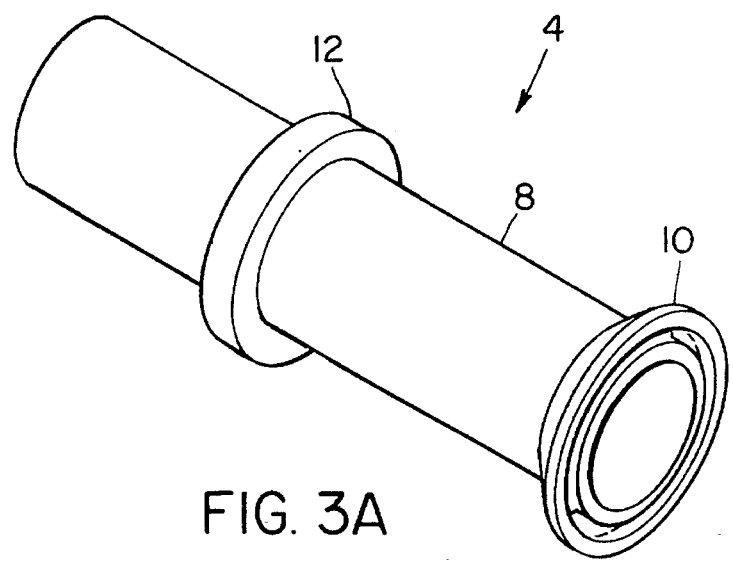
FIG. 3A is a perspective view of a transfer nozzle prior to its attachment to the transfer panel.
Figure 3C:
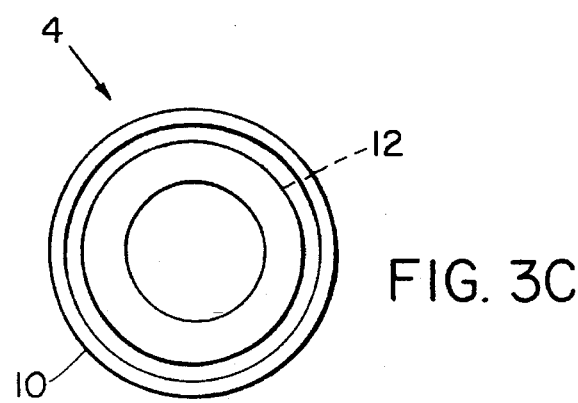
FIG. 3C is an end view of the transfer nozzle.
Figure 3B:
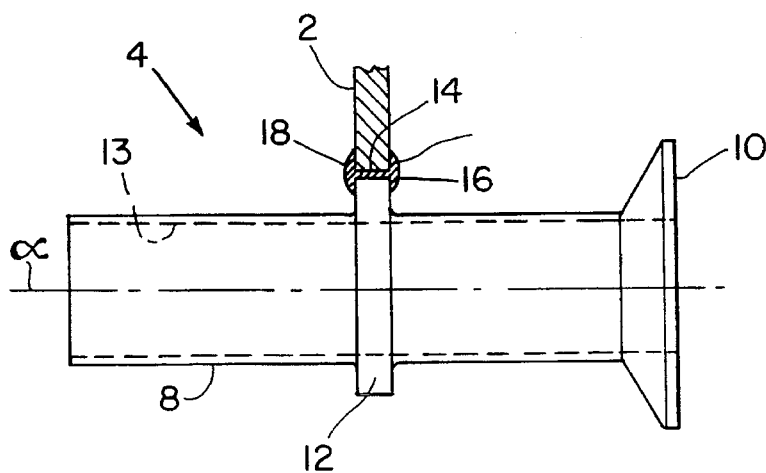
FIG. 3B is a side view of the transfer nozzle, partly in section, when it has been inserted and welded to the transfer panel.

Referring now to FIGS. 3A–3C, each nozzle 4 comprises a stainless steel tube 8, one end may have a flared flange 10 or other means, such as a threaded connector, for attaching pipes, tubes or conduits. The flange 10 will serve as a connector means to any desired pipe, tube, hose or the like. The end of the stainless tube 8 to which the flange 10 is connected will also be known as the "clean" end of the nozzle 4 or the "clean" side of the panel. As seen in FIG. 2, the clean side extends from the panel 2 to the left as viewed in FIG. 2, or to the right as viewed in FIGS. 3B, 4 and 5.

It should be understood, however, that it is not just the flange 10 to which connecting conduits are attached. For example, the U-shaped transfer tube 6 is shown affixed to the opposite ends of two transfer nozzles.

Intermediate the ends of the nozzle 4 is an integral, annular ring 12 completely surrounding the outside diameter of the transfer tube. The ring 12, while it may be totally integral with the metal of the nozzle 4, as for example if the entire tube structure including tube body 8, the ring 12 and the flange 10 were turned from a single piece of metal it may be fabricated from separate pieces. Alternatively, the ring 12 may be press fit on the tube 8 or otherwise secured to it such that it is in intimate contact and firmly secured to the tube. This is also considered "integral." The ring 12 is approximately ¼ inch thick measured axially of the central axis α (FIG. 3B) of the nozzle 4.

The prior art technique employed was to form a hole (or holes) in the panel 2 which are approximately the size of the outside diameter of the steel tube 8 without a flange and to welding the outside diameter of the tube at the intersection with the panel. When the hole was just slightly larger than the outer diameter of the tube 8, and the tubes inserted into the holes, they were welded adjacent the circular intersection between the outer diameter of the tube 8 and the immediate adjacent surface of the transfer panel 2. In other words, prior art nozzles did not have integral annular rings such as ring 12 as in the instant invention. Consequently, the weldment was directed to the outer diameter of the tube 8. Through heat transfer, this caused a burning, charring or pitting of inner diameter 13 (FIG. 3B) of the tube 8. This was attributable to the rapid transfer through the relatively thin wall of the tube. Thus, in the prior art nozzles, the weldment of the tube was made on the nozzle per se spaced only by the relative thin wall of the tube, thus transferring much of the heat of welding to the nozzle resulting in darkening, bubbling and contaminating the interior of the nozzle in the area where the tube 8 passes through the panel 2.

Since absolute cleanliness is needed in a device which conducts pharmaceuticals and other sterile chemicals, this was unacceptable and not correctable by electropolishing.

Figure 4:
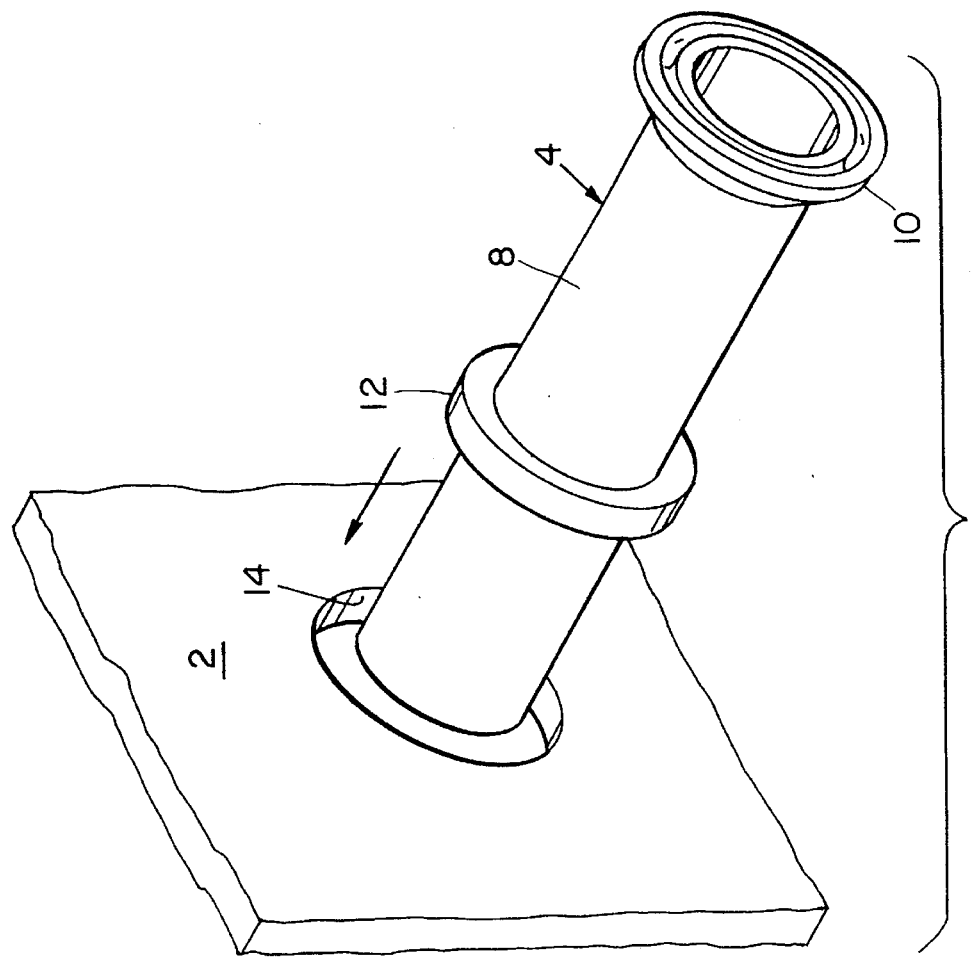
FIG. 4 is a perspective view of the transfer nozzle prior to being welded to the transfer panel.

In the present invention, as seen in the exploded view of FIG. 4, a hole 14 is formed in the transfer panel 2 which is just slightly larger than the diameter of the integral ring 12 on the tube 8 of the nozzle 4. The transfer nozzle 4 is inserted into the transfer panel 2 until its annular ring 12 is aligned with the panel as seen in FIG. 3B. When aligned, the annular ring is welded to the panel 2 by a pair of circular weldments 16 and 18, one each on opposite sides of the panel structure as seen in the sectional portion of FIG. 3B. The "clean" side of the transfer nozzle 4 and the transfer panel 2 is to the right as viewed in FIG. 3B and the "outside" is to the left. Thus, a circular welding bead 16 projects from the panel 2 on the "clean" side and the circular welding bead 18 projects from the panel 2 on the other side.

Figure 5:
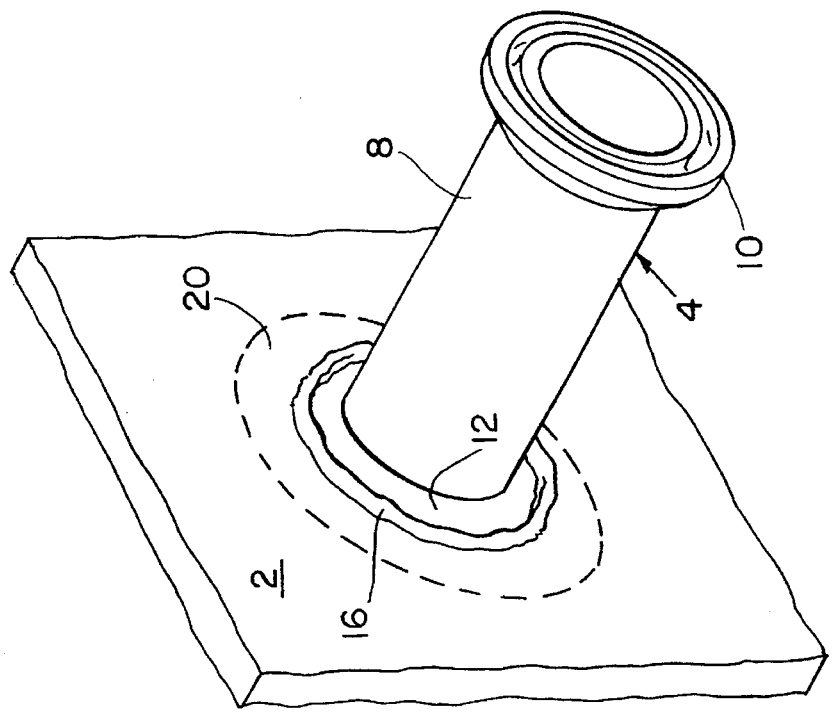
FIG. 5 is a perspective view of the transfer nozzle after it has been welded to the transfer panel.

The result of welding the transfer nozzle 4 to the panel 2 is shown in FIG. 5. The annular ring 12 is visible as is the circular welding bead 16. By this construction, the weldments 16 and 18 both took place at the periphery of the annular ring 12 which is spaced from the outer diameter of the tube 8. Heat is dissipated through the annular ring and with less opportunity for the welding heat to be conducted to the inside or inner diameter 13 of the tube 8, consequently resulting in an unscored, clean interior surface of the transfer tube.

It will be understood that the annular ring 12 is shown for illustrative purposes only. It may assume other shapes or configurations as long as it satisfies the requirement of locating the weldment away from the tube 8 in an outward direction. One example of an alternative construct is to form the annular ring frustoconically, tapering it from its own maximum circumference inwardly toward tubular portion 8 even up as far as the flange 10.

The next step is to remove the welding bead 16 and produce a clean, smooth finish on the transfer panel 2 in an area contained within the dotted circle 20 shown in FIG. 5. The cleaner and smoother the surface, the less prone it is to contamination.

It is also desirable, but not required, that the outer diameter of the tube portion 8 of the transfer nozzle also be clean and polished to prevent contamination.

A mechanism in the form of a cylindrical head 30 (FIGS. 6 and 7) for removing the welding bead 16 and for polishing the area 20 (FIG. 5) will now be described with reference to FIGS. 6 and 7. Optionally, the cylindrical head 30 may also be employed for polishing the outer diameter of the nozzle portion 8 of the transfer tube 4. The grinding and polishing head 30 is split into two parts along a dividing line 32 (FIG. 7). It may also be divided into more than two parts, for example, three or four parts. When assembled, the parts of the head 30 are aligned by tooling pins 34 and held together by a tension band 36. A cap 38 having a shaft 42 projecting from its top is secured, for example, by screws 40 to the top of each of the halves of the polishing and grinding head. The shaft 42 projecting from the cap 38 may be received in the chuck of an electric drill.

The bottom of the assembled head has a circular bottom surface 44 to which abrasive paper or cloth may be attached, as, for example, by pressure sensitive adhesive or by Velcro® brand hook and pile cloth. When initially rotated about the axis α of the transfer tube 4, a relatively high grit abrasive is applied to the surface 44 to remove the welding bead 16. Subsequently, finer grits are used to effect polishing of the entire circular 20 area of FIG. 5.

Each section of the grinding and polishing device 30 includes an arcuate bearing surface 50. Joined together with the mating surface on the other section(s) of the head, they constitute a lower circular bearing surface. This circular surface is engagable with the outer diameter of the tubular portion 8 of the transfer nozzle. Polishing compound may be applied to the surface 50 to polish that portion of the outer diameter of the tube 8 adjacent the flat surface 20 of the panel structure 2. This may be done when the circular welding bead 16 has been flattened to the surface "clean" area 20 of the panel 2. Thus, the tube 8 will also be polished adjacent to the circular intersection of the tube 8 with the panel 2.

Figure 6:
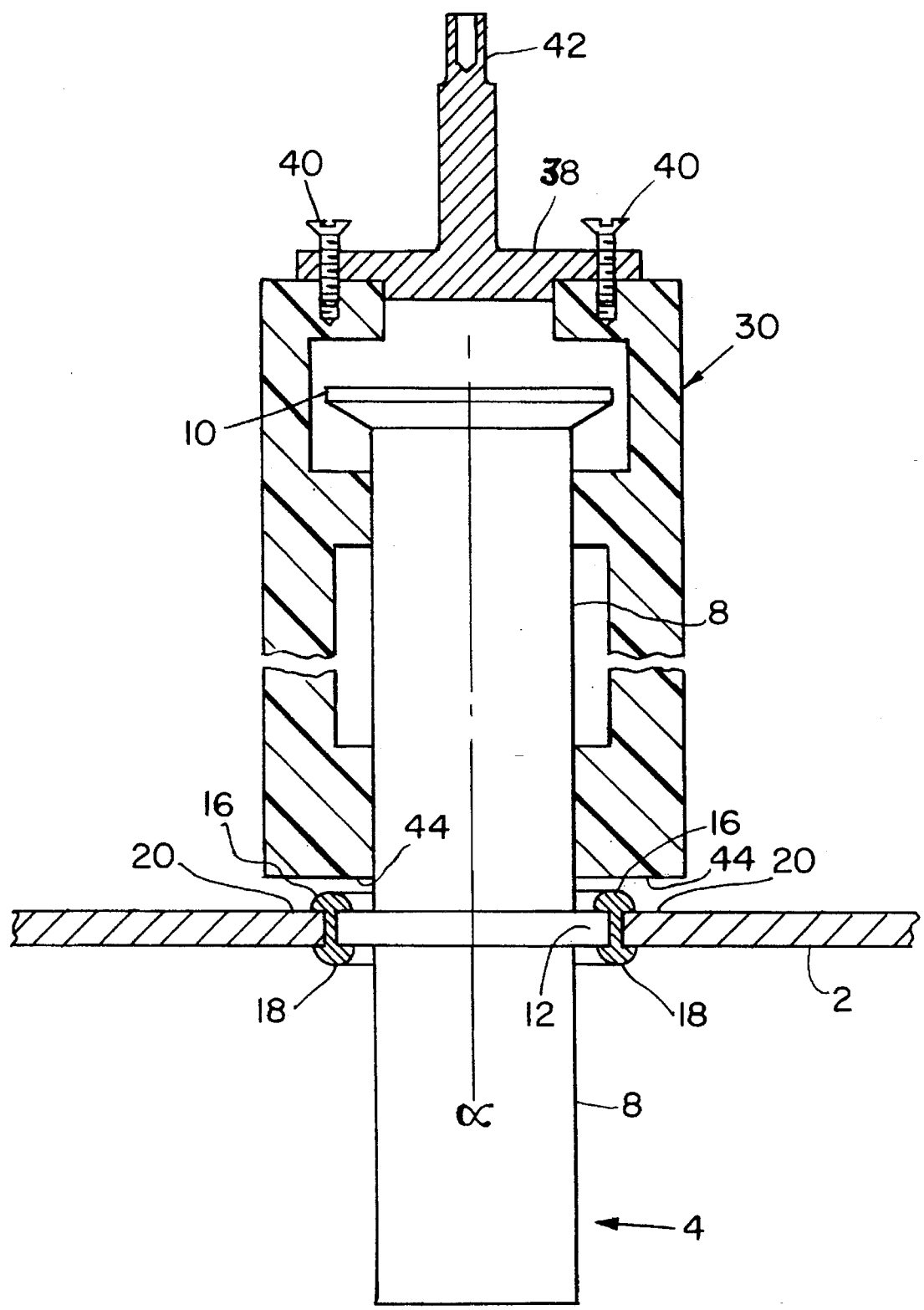
FIG. 6 is a sectional view of a grinding and polishing head for finishing portions of the transfer device.
Figure 7:
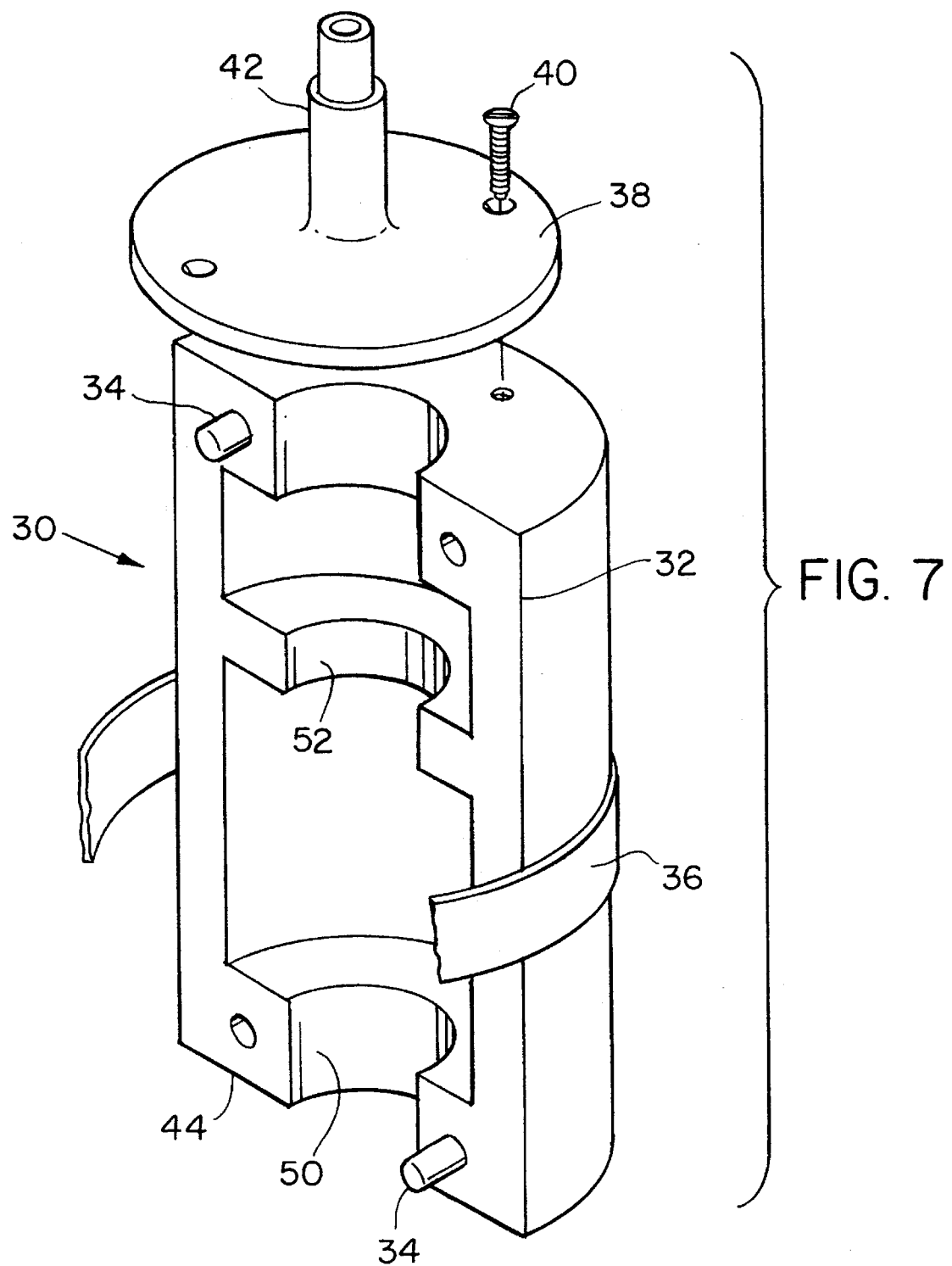
FIG. 7 is an exploded perspective view of the grinding and polishing head.

As will be seen from FIG. 6, the welding head 30 is movable vertically up and down the axis α of the tube 8. An upper circular bearing surface made up of semicircular bearing surfaces 52 in each of the halves of the polishing and grinding head 30 are engagable with the upper portion of the outer diameter of the tube 8. The bearing surfaces 50 and 52 are shown here for illustrative purposes only. However, they may be as wide, measured in the axial direction of the grinding head as is required to polish the entire surface of the tube 8.

The polishing head 8 is moved upwardly relative to the flange 10 of the transfer tube 4 not only to effect a polishing action but to gain access to, and replace or renew, the abrasive material secured to the circular polishing and grinding surface 44 on the bottom of the polishing head.

We claim:

1. A transfer device for liquids such as pharmaceuticals comprising:

a two-sided panel structure;

a circular transfer nozzle projecting through the panel structure;

the nozzle having inner and outer surfaces and one end adapted for connection to a transfer tube;

a ring surrounding an intermediate portion of the nozzle and spaced from said one end for securing the nozzle to the panel structure, the ring having two parallel faces and an outer periphery which is larger than the outer surface of the circular nozzle;

a circular weldment joining the outer periphery of the ring to the panel structure, such that the weldment is spaced from the nozzle;

a flat, polished surface on the panel structure on the side which faces the said one end of the nozzle including the circular weldment and a circular area of the panel structure surrounding the weldment; and the distance between the two parallel faces of the ring is essentially the same as the distance between the two sides of the panel structure.

2. A transfer device according to claim 1 wherein the weldment extends to the side of the panel structure facing away from said one end.

3. A transfer device according to claim 2 wherein there is a flat, polished surface on the panel structure on the side of the panel structure facing away from said one end similar to the flat, polished surface on the side of the panel structure facing said one end.

4. A transfer device according to claim 1 wherein the outer surface of the nozzle is polished.

5. A transfer device according to claim 1 wherein the nozzle has a connector flange on said one end.

6. A transfer device according to claim 1 wherein there are a plurality of nozzles projecting through said panel structure.

7. A transfer device according to claim 1 wherein there are two nozzles projecting through said panel structure joined by a transfer tube.

8. A transfer device according to claim 1 wherein the panel structure is vertical and the nozzle is normal to the panel structure.

9. A transfer device according to claim 1 wherein the transfer panel structure is bounded by a frame member.

* * * * *